Nov. 27, 1956     S. C. PECKETT     2,771,713
APPARATUS FOR AND METHOD OF FORMING A TRUE SURFACE ARTICLE
Filed Sept. 13, 1954     3 Sheets-Sheet 1
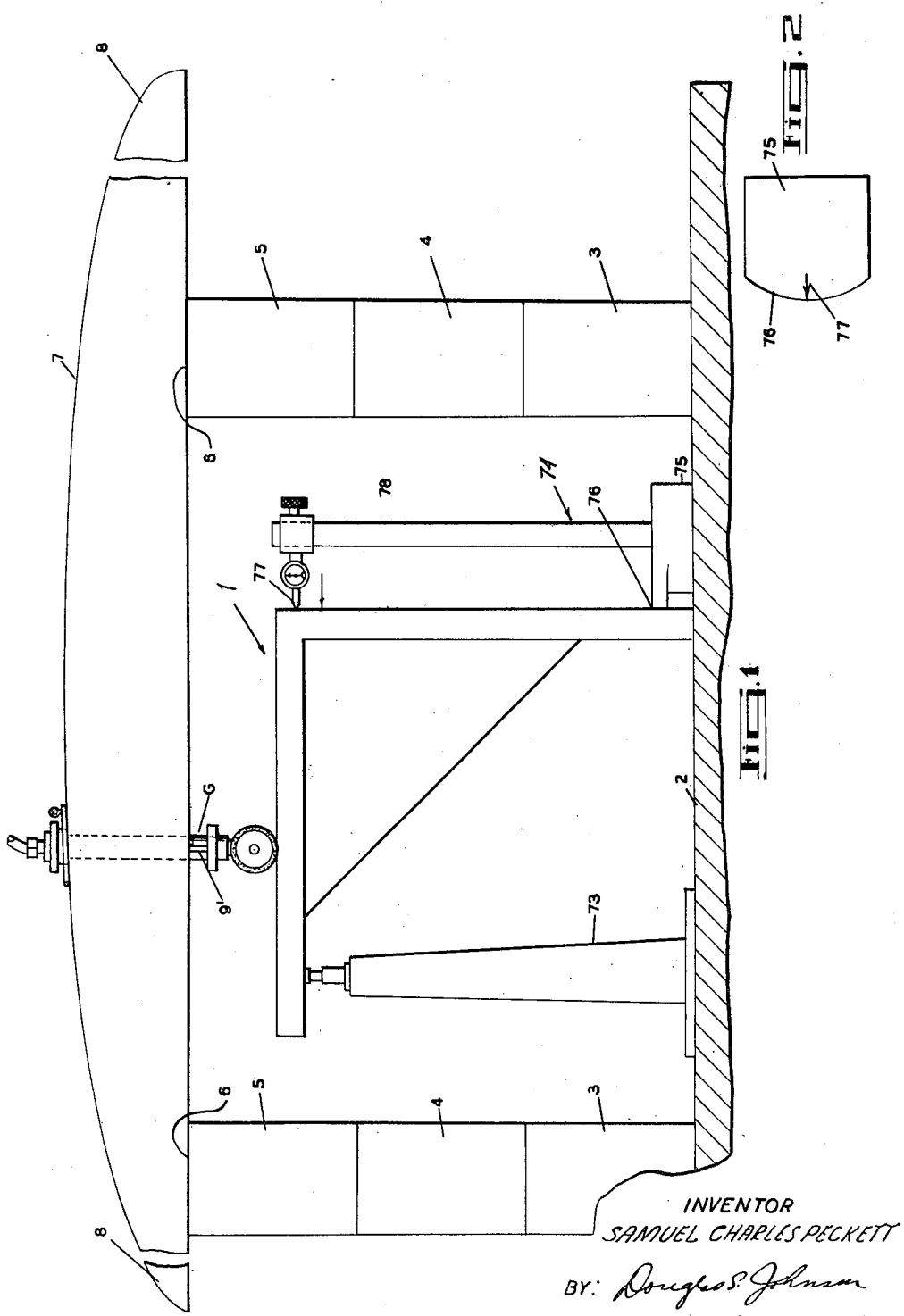
INVENTOR
SAMUEL CHARLES PECKETT
BY: Douglas P. Johnson
ATT'Y Nov. 27, 1956  S. C. PECKETT  2,771,713
APPARATUS FOR AND METHOD OF FORMING A TRUE SURFACE ARTICLE
Filed Sept. 13, 1954  3 Sheets-Sheet 2
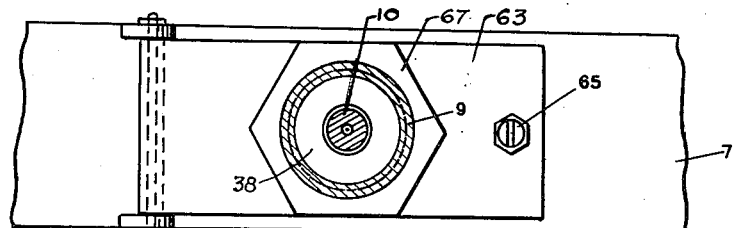
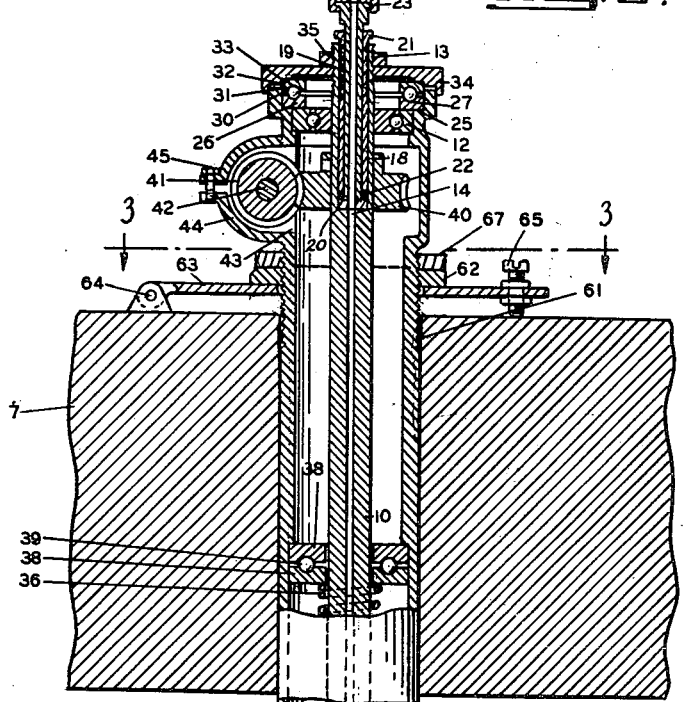
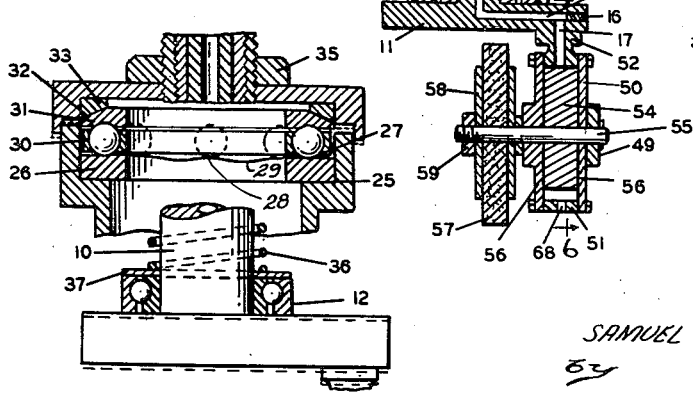
INVENTOR
SAMUEL CHARLES PECKETT
BY
Douglas J. Johnson
ATTY.

Nov. 27, 1956  S. C. PECKETT  2,771,713
APPARATUS FOR AND METHOD OF FORMING A TRUE SURFACE ARTICLE
Filed Sept. 13, 1954  3 Sheets-Sheet 3
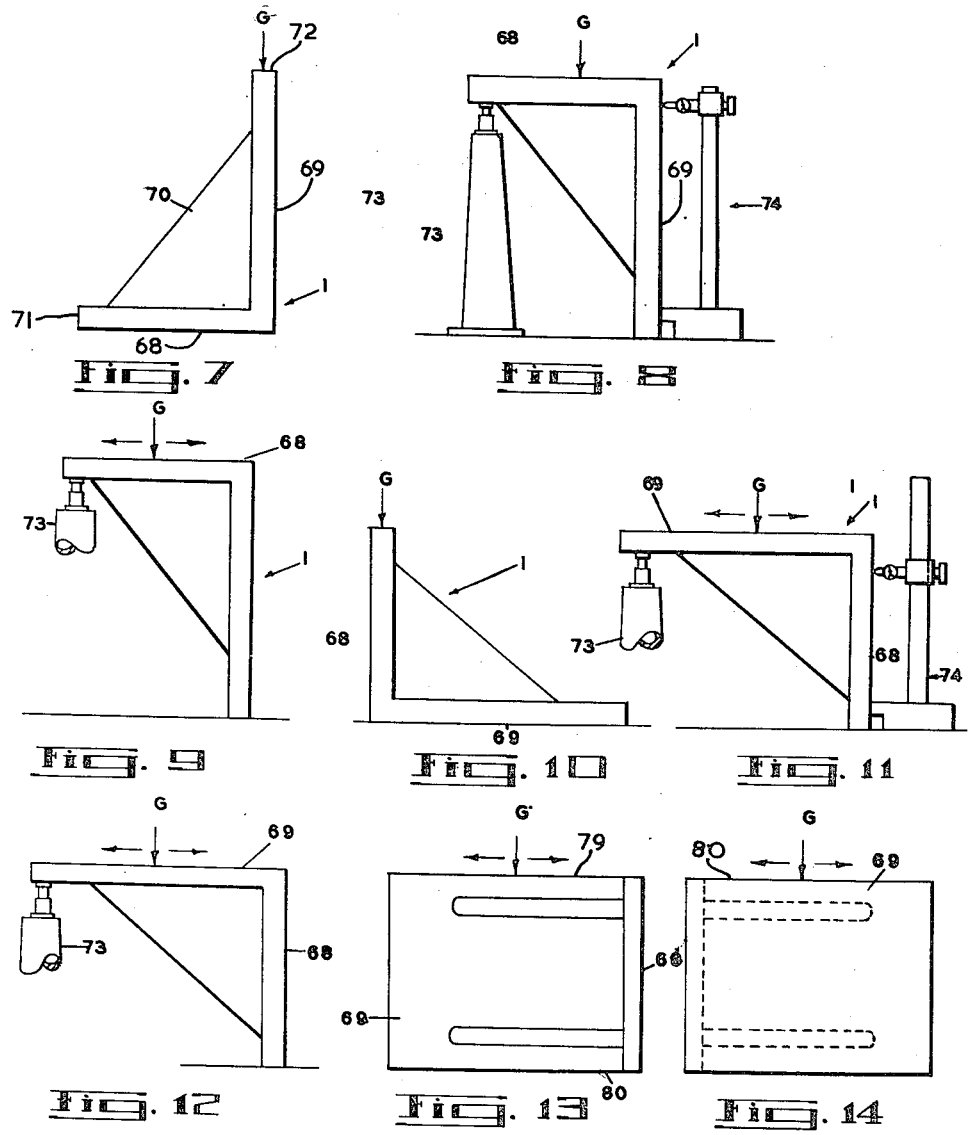
INVENTOR
SAMUEL CHARLES PECKETT
BY: Douglas S. Johnson
ATT'Y

United States Patent Office 2,771,713
Patented Nov. 27, 1956

2,771,713

APPARATUS FOR AND METHOD OF FORMING A TRUE SURFACE ARTICLE

Samuel Charles Peckett, Toronto, Ontario, Canada

Application September 13, 1954, Serial No. 455,453

11 Claims. (Cl. 51—43)

This invention relates to improvements in the preparation of true surfaces and more particularly to the preparing of true surfaces especially on multi-surfaced articles such as angles, parallels, cubes and the like.

In the preparation of true surfaces the surface must be perfectly accurate but must not be dead smooth, otherwise suction will prevent other surfaces from moving easily over the true surface. In consequence it is known in the art to be highly desirable to finely scrape or score the surface while leaving the accuracy unimpaired.

While different scraping apparatus has been evolved, the industry has not found these completely satisfactory and where optimum results are required almost invariably resort is made to the old laborious time-consuming hand scraping.

There are many problems in the surfacing with mechanical apparatus; the accuracy of the surface is usually spoiled by deformation under the heat and/or pressure of the grinding apparatus; the surface is liable to be damaged by cutting too deeply with the positively driven grinder and the surfaces of angled members and small area surfaces are almost inaccessible to the grinding elements.

Further, in addition to a lack of complete accuracy, the desirability and uniformity of appearance of the finished surfaces ground with mechanical apparatus has heretofore fallen short of the old hand scraped surface. The problem of providing accurate surfaces with grinding apparatus is steadily becoming more acute as relatively few skilled and experienced men capable of fine work are available and their number is steadily decreasing.

In United States Patent No. 2,688,826 I have disclosed the method and apparatus which will render machine ground true surfaces superior to the finest hand scraped surfaces for accuracy, uniformity and appearance providing a particularly desirable surface pattern which can be produced by relatively inexperienced workmen at a great saving in costs.

While the method and apparatus disclosed in the said copending application has particular application to the production of surface plates and the surface of machine ways and like surfaces, this application is directed especially to the preparation of multi-surfaced true surfaced objects such as angle plates, cubes, V blocks and the like and also for the preparation of true surfaces on large objects such as large surface plates or the like.

As pointed out above it is extremely difficult to produce hand scraped true surface items such as surface plates and previous machine grinding has had serious disadvantages.

When it comes to producing objects such as angles or cubes where not only must the objects present a number of surfaces in themselves which must be precisely flat, but each surface must be precisely at the correct angle to adjacent or adjoining surfaces. Thus the labouriousness of the task of hand scraping such objects is multiplied many times over the hand scraping, for instance of a surface plate, and for practical purposes it is today almost impossible to obtain accurate hand scraped multi-surfaced items.

At the very best present day hand scraped items have a very minimum of surfaces finished or scraped and many of the surfaces are left unfinished because of the time and cost involved in attempting to scrape all surfaces presented by the article.

It is therefore the object of the present invention to enable precisely accurate true surface objects or articles such as parallels, cubes, angle plates and the like to be produced to embody a plurality of true surfaces which not only exhibit the accuracy, uniformity and appearance unobtainable by hand scraping, but also which are precisely in desired angular relation, normally in 90° relation or parallel relation.

Another important object is to enable all of the surfaces of the item or article being produced to be finished at a reasonable cost to provide more uniform and pleasing appearing and more accurate articles of this nature than heretofore possible.

In accordance with this invention the surfacing of an object to be provided with a plurality of true surfaces is carried out by supporting the object on a true surface with one surface essentially parallel to the true surface, then grinding the parallel object surface by a grinding action to reduce the surface to a true surface precisely parallel to the supporting true surface, then using the trued object surface as a first reference surface, placing the reference surface on the supporting true surface and grinding any surface on the object required to be parallel to the reference surface to reduce it to a true surface precisely parallel to the supporting true surface and hence to the first reference surface.

By repeating this procedure around the object, all surfaces are reduced to true surfaces which are precisely parallel to any other surface or surfaces or are in precise angular relation usually 90° with another or other sur faces.

According to the invention the grinding is carried out by cutting or grinding the surface with an interrupted cutting or grinding action while continuously changing the direction of cut at a constant uniform rate to reduce the surface to an accurate level while presenting a surface pattern of criss-crossing overlapping surface cuts defining a multiple of high spots constituting the true surface pattern separated by valleys between said spots.

By the grinding of the surface with the interrupted cutting action described, the surface is maintained free from significant heat distortion and further it has been found that with such a cutting action it is not necessary during grinding to clamp or secure the surface in any manner which would set up stresses or cause any surface deflections.

In the case of angle plates which present a series of small area edges to be cut or ground, it is a feature of the invention to first support the angle plate from an edge, and by means of a height gauge to bring a large area surface of the plate required to be parallel to the supporting surface into a position as closely as possible parallel to the supporting surface plate whereupon the large surface area is reduced to a true surface precisely parallel to the supporting true surface on grinding, and with the large surface area as a reference surface, the small surface edge areas can be quickly reduced to a true surface precisely parallel to the large area true surface. These and other objects and features will become apparent from the following description taken in conjunction with the accompanying drawings in which Figure 1 is an elevational view illustrating the surfacing of an angle plate in accordance with the invention.

Figure 2 is a plan view of the height gauge for the initial setting up of the angle plate.

Figure 3 is an enlarged horizontal plan section showing the mounting of the grinding device in the straight edge beam with the beam being broken away at the ends.

Figure 4 is an enlarged vertical sectional detail of the grinding device supported in the beam.

Figure 5 is an enlarged fragmentary mid-vertical sectional detail illustrating the means for vibrating the cutting head perpendicular to the surface to be trued.

Figure 6 is a vertical sectional detail on the line 6—6 of Figure 4.

Figures 7–14 are elevational more or less diagrammatic views illustrating the sequence of steps in preparing an angle plate in accordance with the invention.

With reference to Figure 1 the arrangement of apparatus to carry out the surfacing of an angle plate generally designated at 1 is illustrated and comprises a large supporting true surface in the form of a surface plate 2. Mounted on the surface plate 2 which is formed with a true surface precisely level throughout its area are spaced pairs of parallels 3, 3; 4, 4 and 5, 5, the parallels 3, 4 and 5 being arranged in superimposed relation. These parallels again have precisely accurate or level flat parallel surfaces which rest one upon the other with the upper surfaces 6, 6 of the parallels 5, 5 forming the "ways" of the apparatus along which slides a bridge type master straight edge or beam 7.

The straight edge beam 7 is free to slide both longitudinally of the parallels 3—6 and also transversely of the parallels in the direction of the straight edge, the straight edge having sufficient overhang as at 8 so that it can move transversely substantially the full distance between the sets of parallels. Supported by and extending through the straight edge 7 is a grinding device generally designated at G and corresponding to the grinding device disclosed in the said United States Patent No. 2,688,826.

As shown particularly in Figure 4 this device comprises a cylindrical casing 9 in which is journalled a vertical shaft 10 terminating at the lower end in an enlarged flange 11. The shaft 10 rotates in ball bearings 12 and is formed with a threaded upper end 13 and with a central bore 14 which has a lateral extension 15 extended radially of the flange 11, the end of the bore extension being sealed with a plug 16. An orifice 17 provides an outlet from the extension 15 to the lower face of the flange.

At the upper end the shaft is also provided with an enlarged counterbore 18 in which seats an inner tube 19 formed with an enlarged lower end defining a shoulder 20.

The interior of the counterbore 18 is also threaded to be engaged by a sleeve 21 mounted on the tube 19 and compressing a resilient annular packing or washer 22 against the shoulder 20 to form an effective air seal. The tube 19 is connected to a compressed air source through a suitable fitting 23 connecting the tube to a flexible air line 24. At the upper end the casing 9 is enlarged to define an annular seat 25 on which is supported a ring 26 seen particularly in Figure 5 which is formed by the groove 27 having a varying surface contour alternating between peaks and depressions 28 and 29 respectively. Rolling in this groove 27 are the balls of the ball race 30 and overlying the ball race 30 is a grooved ring 31 formed with a chamfered peripheral edge 32 engaged by correspondingly chamfered ring 33 received beneath the cap 34 held in position by a nut 35.

Urging the shaft 10 downwardly is a heavy coil spring 36 held in compression between a bearing ring 37 and the lower of rings 38 of a ball race 39. The action of this spring is to hold the cap 34 downwardly to force the balls of the ball race 30 to ride on the bearing surface of the groove 27. The result is that upon turning of the shaft 10 a longitudinal reciprocating motion will be imparted thereto as the balls roll over the peaks 28 and into the depressions 29.

The height of the peaks 28 measured from the bottoms of the depressions 29 will of course be extremely small, of the order of 0.1–0.4 thousandths of an inch.

The use of the chamfered rings 32 and 33 provides a centering action to insure that the assembly is correctly centered and the balls of the ball race 30 are accurately registered with the groove 27.

Rotation is imparted to the shaft 10 through a worm gear 40 driven by a worm 41 mounted on a shaft 42 extending right angularly to the shaft 10. The casing 9 is formed with an opening 43 through which the worm 41 projects to engage the worm gear 40. A split semicylindrical horizontal casing 44 encloses the worm and is drawn into closed position by the bolts 45.

The drive to the shaft 42 is preferably obtained from a compressed air motor similar in construction to the motor employed in driving the grinding element hereinafter described.

The grinding or cutting head of the unit G is generally designated at 49 and comprises a compressed air motor 50 secured to the underside of the flange 11 of the shaft 10. The motor 50 in turn comprises a cylindrical casing 51 having a vertical projection 52 formed with a bore 53 registering with the orifice 17 communicating with the air passages or bores 14 and 15 in the shaft 10.

As shown particularly in Figure 6 a range within the casing 51 is a radial vane rotor 54 mounted eccentrically of the casing on the shaft 55 journalled horizontally in bearings in end plates 56 closing the ends of the casing 51. Mounted on the shaft 55 substantially in alignment with the axis of the main shaft 10 is a grinding wheel or element 57 located between a pair of flanges 58 and gripped thereby under the locking action of a nut 59 forcing the assembly against a shoulder 60.

The casing 9 which is keyed in an extremely accurate bore in the straight edge by a key 9', is formed with a threaded portion 61 carrying a nut 62 which is adapted to bear on a plate 63 hinged to the top of the straight edge 7 at 64. The opposite end of the plate 63 carries a set screw 65. The nut 62 provides for coarse vertical adjustment of the casing 9 while the set screw provides for fine vertical adjustment. If plate 3 is made long, to reduce the vertical movement of the set screw at the casing, very accurate, vertical casing movement is achieved. A lock nut 67 on the threaded casing portion 61 serves to lock nut 62 in preset position.

In operation it will be seen that the grinding wheel 57 has a peculiar composite motion. It is rotated above the axis of the shaft 55 which axis is parallel the master surface presented by the surface plate 2. Simultaneously the cutting head 49 and shaft 10 are vertically reciprocated by means of the ball race 30 operating over the contoured surface of the groove 27. The cutting action provided with such movement is such as to maintain the surface of an object being ground free of significant heat distortion while continuously changing the direction of the cut to reduce the surface to an accurate level while presenting a surface pattern of criss-crossing overlapping surface cuts. The particular mechanism shown changes the direction of the cut at a constant uniform rate and the criss-crossing overlapping pattern of surface cuts on an object being trued defines a multiple of high spots constituting a true surface with the high spots separated by valleys therebetween to provide a particularly desirable as well as attractive surface in which the "spots" are substantially uniform throughout an area and occur with a high incidence throughout the area. In the carrying out of the production of true surface articles, for instance an angle 1, the angle is formed to present two right angular surfaces 68 and 69 of a relatively large area with these surfaces being bridged by webs 70 to give rigidity. In the original forming of the angle 1 the broad area surfaces 68 and 69 are reduced by machining to relatively flat surfaces wherein the difference in level of various points throughout the surface may be of the order of only a few thousands and the angular relation between the surfaces will closely approximate 90°. However, in such condition such surfaces are totally useless for accurate measurements and it is the reduction of these surfaces to precisely flat surfaces in precisely 90° relation with which the invention is concerned.

It is also the object of the invention to reduce all of the smaller area surfaces such as the edge surfaces 71 and 72 into accurately flat surfaces either perpendicular or parallel to the large area surfaces 68 and 69. To this end, as shown in Figure 7, the angle 1 may be placed on the surface plate 2 and one of the edges, say 72, ground with the grinding element 57 by moving the straight edge 7 longitudinally of itself and longitudinally of the parallel edges 6, 6 to reduce the edge 72 into an accurately flat surface precisely parallel with the master surface formed by the surface plate 2.

Then, as illustrated in Figures 1 and 8, the angle plate is supported on its edge 72 from the surface plate 2 and a jack 73 engaging in the opposite end of the surface 68 is adjusted to erect the angle plate until the surface 69 as indicated by the height gauge 74 is substantially or essentially perpendicular to the surface plate 2. As will be understood by those skilled in the art the height gauge 74 comprises of base 75 having a curved contacting edge 76 adapted to engage the surface 69 adjacent the surface plate. An indicator 77 mounted on the standard 78 is adapted to engage the surface 69 at a point spaced above the surface plate 2 by adjustment of the jack 73 until the indicator 77 just touches the surface 69 as the base 75 of the height gauge is swung back and forth through an arc with the curved edge 76 being maintained in contact with the surface 69. Then the surface 69 will be perpendicular to the surface plate 2 subject to the variations in level in the surface 69. With this arrangement the large area surface 68 is brought very closely into parallelism with the accurate supporting true surface formed by surface plate 2. Then upon grinding the surface 68 by movement of the beam or straight edge 7 longitudinally of its length back and forth across the surface while moving it broadside along the true surface edges presented by the parallels it is reduced to a true surface precisely level throughout its area and precisely parallel with the true surface presented by the surface plate 2. By the particular interrupted cutting action described the surface 68 is maintained free of significant heat distortion to cause it to warp or alter dimension and the surface is surfaced with the particular desirable pattern above described. The motion of the grinding element 57 to provide this area surfacing on movement of the straight edge 7 is illustrated in Figure 9. At this point the surface 68 constitutes an exact true surface which may be considered as a reference true surface. As a next step as illustrated in Figure 10 to facilitate the supporting of the angle for the subsequence step of Figure 11 the edge 71 of the angle is ground into a level surface with the angle resting on the large area surface 69. Then the angle is inverted and with the edge 71 resting on the true surface presented by the surface plate 2 the angle is re-erected by jacking to bring the precisely accurate reference surface 68 precisely perpendicular to the true surface 2. Then grinding is carried out on the surface 69 which because of, perhaps, a small inaccuracy in the angle that it formed with the surface 68, and also because of small variations in its flatness was not precisely parallel to the true surface 2. However, upon the grinding action as above described the surface 69 is reduced to a surface precisely flat throughout its area and precisely parallel with the true surface 2 and hence exactly perpendicular to the surface 68. The movement of the grinding element to produce this surfacing is indicated in Figure 12. The surface 69 then becomes a second reference surface and by placement of the reference surfaces 68 and 69 on the true surface 2, all surfaces parallel thereto, can be quickly and easily reduced to precisely level and precisely parallel surfaces, for instance the edge surfaces 71 and 72, which had been reduced to level surfaces previously but which might not be precisely perpendicular to their respective adjacent large area surfaces, will upon the subsequent grinding with the reference surfaces formed by the ground and prepared surfaces 68 and 69 resting on the master true surface be reduced into exact parallelism with their respective parallel reference surfaces. By continuing the method other edge surfaces as indicated at 79 and 80 may be quickly and easily reduced to accurately level and precisely parallel true surfaces. While the invention has been particularly described in connection with angle plates it will be appreciated that it will be equally applicable to other multi-surfaced items such for instance as parallels, cubes, straight edges, machine parts such as the knees of milling machines, or the like. In the case of cubes the supporting jack 73 may be replaced by shims where necessary as will be understood by those skilled in the art.

While the micrometer adjustment for vertically positioning the abrading element 57 is provided by the adjustment of the nut 62 and thumb screw, major adjustments of height are affected by removing or adding pairs of the parallels 3, 3.

In addition to providing for the surfacing of multi-surfaced articles the invention also enables relatively large surfaced articles such as relatively large surface plates and straight edges to be quickly and easily surfaced with the master straight edge 7 sliding transversely and longitudinally of the master edges 6, 6 of the parallels to guide the abrading element over the work surface while maintaining it precisely parallel to the supporting true surface 2.

As pointed out above because of the peculiar composite motion of the grinding wheel 57 grinding may be carried out without clamping the angle or other article being ground so that the article will not be ground while in a distorted or deflected position which occurs when conventional grinding is carried out and the article being ground is tightly clamped.

It will be understood that various modifications and alterations in detail of the apparatus and in the sequence of the steps of the method to suit the particular application may be made without departing from the spirit of the invention as set forth in the appended claims.

What I claim as my invention is:

1. The method of forming a true surface article to have at least two true surfaces, comprising erecting said article on a true surface with one surface of the article substantially parallel to said supporting true surface, grinding said substantially parallel article surface with an interrupted grinding action carried out precisely parallel to said supporting surface to reduce the article surface into a reference true surface precisely parallel to said supporting true surface, re-erecting said article to locate said reference true surface in precise relationship to said supporting true surface to bring a second surface of said article into a position substantially parallel to said supporting true surface, and grinding said second surface with said interrupted cutting action to reduce said second surface into a true surface precisely parallel to said supporting true surface and having a precisely accurate relationship to said reference surface.

2. A method of forming a true surface article to have at least two true surfaces comprising erecting said article on a true surface with one surface of the article substantially parallel to said supporting true surface, grinding said substantially parallel surface with an interrupted cutting action carried out precisely parallel to said supporting surface to maintain the article surface free of significant heat distortion while continuously changing the direction of the cut to reduce the article surface into a reference true surface precisely parallel to said supporting true surface, re-erecting said article to locate said reference true surface in precise relationship to said supporting true surface to bring a second surface of said article into position substantially parallel to said supporting true surface, and grinding said second surface with said interrupted cutting action while continuously changing the direction of the cut to reduce said second surface into a true surface precisely parallel to said supporting true surface and having a precisely accurate relationship to said reference surface.

3. A method of forming a true surface article to have at least two true surfaces in precisely accurate relationship comprising erecting said article on a true surface with one surface of the article substantially parallel to said supporting true surface, grinding said substantially parallel surface with an interrupted grinding action carried out precisely parallel to said supporting surface to maintain the article surface free of significant heat distortion while continuously changing the direction of the cut at a constant uniform rate to reduce the article surface to an accurately level reference true surface precisely parallel to said supporting true surface and presenting a surface pattern of criss-crossing overlapping surface cuts defining a multiple of high spots constituting said precisely parallel true surface and separated by valleys between said high spots, re-erecting said article to locate said reference true surface in precise relationship to said supporting true surface and grinding said second surface with an interrupted grinding action in the same manner as said reference surface to reduce said second surface into an accurately level true surface precisely parallel to said supporting true surface and having a precisely accurate relationship to said reference surface.

4. A method of forming a true surface article to have at least two true surfaces in precise 90° relation comprising erecting said article on a true surface with one surface of the article substantially parallel to said supporting true surface, grinding said substantially parallel article surface with an interrupted grinding action carried out precisely parallel to said supporting surface to reduce the article surface into a reference true surface precisely parallel to said supporting true surface, re-erecting said article to locate said reference true surface in a position precisely perpendicular to said supporting true surface to bring a second surface of said article in 90° relation to said reference true surface into position substantially parallel to said supporting true surface and grinding said second surface with said interrupted grinding action to reduce said second surface into a true surface precisely parallel to said supporting true surface and having a precisely accurate 90° relationship to said reference surface.

5. A method of forming a true surface article to have at least two true surfaces in precise 90° relationship comprising erecting said article on a true surface with one surface of the article substantially parallel to said supporting true surface, grinding said substantially parallel surface with an interrupted grinding action carried out precisely parallel to said supporting surface to maintain the article surface free of significant heat distortion while continually changing the direction of grinding to reduce the article surface into a reference true surface precisely parallel to said supporting true surface, re-erecting said article to locate said reference true surface in a position precisely perpendicular to said supporting true surface to bring a second surface of said article in substantially 90° relation to said reference surface into position substantially parallel to said supporting true surface, and grinding said second surface with an interrupted grinding action as aforesaid to reduce said second surface into a true surface precisely parallel to said supporting true surface and precisely at 90° to said reference true surface.

6. A method of forming a true surface article to have at least two true surfaces in precise 90° relation comprising erecting said article on a true surface with one surface of the article substantially parallel to said supporting true surface, grinding said substantially parallel surface with an interrupted grinding action carried out precisely parallel to said supporting surface to maintain the article surface free of significant heat distortion while continuously changing the direction of the grinding at a constant uniform rate to reduce the article surface to an accurately level reference true surface precisely parallel to said supporting true surface and presenting a surface pattern of criss-crossing overlapping surface cuts defining a multiple of high spots constituting precisely parallel true surface and separated by valleys between said high spots, re-erecting said article to locate said reference true surface in a position precisely perpendicular to said supporting true surface, to bring a second surface of said article in substantially 90° relationship to said reference true surface into a position substantially parallel to said supporting true surface, and grinding said second surface with an interrupted grinding action in the same manner as said reference surface to reduce said second surface into an accurately level true surface precisely parallel to said supporting true surface and having a precisely accurate 90° relationship to said reference surface.

7. A method of forming an angle plate to have two relatively large area surfaces disposed in accurate right angular relation comprising supporting the angle plate on one edge on a true surface and jacking said plate at a point remote from said edge, to bring one of said large area surfaces substantially parallel to said supporting true surface, grinding said substantially parallel surface with an interrupted cutting action carried out precisely parallel to said supporting surface to maintain said parallel surface free of signficiant heat distortion while continuously changing the direction of the cut to reduce said substantially parallel surface into a reference true surface precisely parallel to said supporting surface, erecting said true surface article to locate said reference surface precisely perpendicular to said supporting true surface to bring the other relatively large surface area into position substantially parallel to said supporting true surface, grinding said other surface with an interrupted cutting action to maintain said other surface free of significant heat distortion while continuously changing the direction of cut to reduce said other surface into a second reference true surface precisely parallel to said supporting surface and precisely perpendicular to said first reference surface, then grinding surfaces desired to be parallel with said reference surfaces with the respective reference surface resting on said supporting true surface.

8. A means of producing true surface articles to have at least two true surfaces in precisely accurate relation comprising a supporting true surface, at least one pair of true surface parallels disposed on said true surface in substantially parallel relation, a straight edge bridging said parallels and slidable therealong and perpendicularly thereto, an abrading wheel means supporting said abrading wheel to rotate about an axis parallel to the supporting true surface, means supporting said latter wheel supporting means from said straight edge for rotation about an axis perpendicular to said supporting surface, means for rotating said wheel about said axis parallel said supporting surface, and power operated motor means to rotate said wheel-supporting means about said axis perpendicular to said supporting surface during rotation of said wheel.

9. In combination with the apparatus as claimed in claim 8, means to precisely locate a true surface perpendicular to said supporting true surface.

10. A means of producing true surface articles to have at least two true surfaces in precisely accurate relation comprising a supporting true surface, at least one pair of true surface parallels disposed on said true surface in substantially parallel relation, a straight edge bridging said parallels and slidable therealong and perpendicularly thereto, a rotatable abrading wheel, means supporting said wheel from said straight edge to move into and out of contact with an article disposed on said supporting true surface, means for rotating said abrading wheel and power operated motor means for activating said wheel into and out of contact with an article disposed on said supporting true surface during rotation of said wheel.

11. Apparatus as claimed in claim 8 in which the means supporting the abrading wheel from the straight edge is supported to move perpendicular to the straight edge and screw threaded adjusting means are provided controlling the movement of said perpendicular movement.

References Cited in the file of this patent

UNITED STATES PATENTS

| | | |
|---|---|---|
| 741,335 | Hibbard | Oct. 13, 1903 |
| 2,070,944 | Hillix | Feb. 16, 1937 |
| 2,364,506 | Berczny | Dec. 5, 1944 |
| 2,450,157 | Peckett | Sept. 28, 1948 |